United States Patent

Pickholtz

[15] 3,675,131

[45] July 4, 1972

[54] COHERENT SINGLE SIDEBAND PHASE LOCKING TECHNIQUE

[72] Inventor: Raymond L. Pickholtz, Brookyln, N.Y.

[73] Assignee: International Business Machines Corporation, Armonk, N.Y.

[22] Filed: Jan. 15, 1971

[21] Appl. No.: 106,763

[52] U.S. Cl. ..............................325/329, 325/444, 328/133, 329/50

[51] Int. Cl. ..........................................................H04b 1/68

[58] Field of Search .............179/15 BC, 15 FS; 325/60, 329, 325/330, 331, 346, 419, 444; 328/133; 329/50, 124, 125; 331/172; 332/44, 45

[56] References Cited

UNITED STATES PATENTS 3,508,155 4/1970 Voelcker ..............................325/329

*Primary Examiner*—Robert L. Griffin

*Assistant Examiner*—Albert J. Mayer

*Attorney*—Hanifin and Jancin and Maurice H. Klitzman

[57] ABSTRACT

A phase-locked loop system capable of producing a synchronous reference of the proper frequency and phase to coincide with the frequency and phase of a transmitted single sideband modulated signal in order to properly demodulate the received signal for baseband recovery of the data. The invention makes use of post detection feedback to generate an error signal for locking a voltage control oscillator (VCO) to the correct phase for synchronous demodulation without using a transmitted carrier tone. The error signal which is equal to the sum of the baseband data waveform squared, plus the Hilbert transform of the baseband data waveform squared, times the sine of the phase difference between the VCO output and the input signal is generated from the delayed output of a first product demodulator, the delayed output of a second product demodulator and the output of the signal detector.

8 Claims, 2 Drawing Figures

INVENTOR
RAYMOND L. PICKHOLTZ

BY Maurice H. Klitzman
ATTORNEY

COHERENT SINGLE SIDEBAND PHASE LOCKING TECHNIQUE

BACKGROUND OF THE INVENTION

The present invention relates generally to communication systems and more particularly to phase-locked loop systems to provide an improved mode of reception of single sideband amplitude modulated signals.

The present invention has particular application to amplitude modulated communication systems of the kind in which the carrier and one of the sidebands thereof are suppressed. When such single sideband modulation is used, as a transmission technique for data communications, it is imperative that a synchronous reference of the proper frequency and phase be available at the receiver, in order to properly demodulate the received signal for baseband recovery of the data. Prior art systems have accomplished this synchronization by transmitting a carrier (or tones harmonically related to the carrier) or pilot tones along with the single sideband signal. This tone was then filtered in the receiver and used to phase-lock a local oscillator which was then used to synchronously detect the signal. Another prior art system accomplished this synchronization by transmitting a vestige of the suppressed sideband with the transmitted single sideband and compared this vestigial sideband with the single sideband to phase-lock a local oscillator. The local oscillator was then used to synchronously detect the signal. Both of these prior art systems were wasteful of power, in that the transmission of the additional carrier tone or vestigial sideband was required. Additionally, when the carrier tone technique was used on channels with severe phase distortion, such as a loaded telephone cable, the received reference phase was generally incorrect due to the differential phase delay of the signal and the transmitted carrier tone. The carrier tone method was also very sensitive to phase jitter introduced on the channel by heterodyning operations and channel disturbances.

It is, therefore, an object of this invention to provide an improved system for phase-locking single sideband amplitude modulated signals.

It is another object of the present invention to provide a simple and effective means for maintaining proper synchronization of a locally generated signal with the carrier of a single sideband signal without the transmission of a carrier tone or a vestigial sideband.

A further object of the present invention is to provide an apparatus to eliminate phase jitter introduced by heterodyning operations and transmission disturbances.

SUMMARY

The present invention accomplishes the above objects by the generation of a local oscillation at the known carrier frequency. The local oscillation is then combined with the received or input signal in a first product demodulator while the quadrature signal of the local oscillation is concurrently combined with the received or input signal in a second product demodulator. The output of the first product demodulator is detected by a detector and the output is applied to a function generator along with the delayed output of the first product demodulator and the delayed output of the second demodulator to produce an error signal which is used to phase lock the local oscillator with the input signal carrier frequency. The error signal or output of the function generator is equal to the sum of the baseband data waveform squared plus the Hilbert transform of the baseband data waveform squared, times the sine of the phase angle difference between the local oscillator frequency and the input signal carrier frequency.

A feature then of the present invention resides in the phase-locking of the local oscillator without the necessity for a carrier tone or a vestigial sideband.

These and other objects, advantages and features of the present invention will become more readily apparent from the following specification when taken in conjunction with the drawings.

GENERAL DESCRIPTION:

In a single sideband system, the transmission can be characterized by writing the total signal as a sum of in-phase and quadrature components. That is, $$s(t)=f(t)\cos wt+\hat{f}(t)\sin wt$$

where $s(t)$ represents the single sideband signal, $f(t)$ is the filtered version of the baseband data waveform $d(t)$, $\hat{f}(t)$ is the Hilbert transform of $f(t)$, and $w$ is the angular carrier frequency of the transmitter. The Hilbert transformation of a signal, which is well known to those of skill in the art of communication systems, is more fully described for a single sideband signal in "Communication Systems and Techniques" by M. Schwartz, W. Bennett and S. Stein, McGraw-Hill Book Company, 1966, pages 29–35.

The present invention depends on the use of a post detection feedback to generate an appropriate error signal or control signal for locking a local oscillation generation means to the carrier frequency of the input signal to the correct phase for synchronous modulation. The theory upon which the error signal or control signal is generated will be described utilizing the general embodiment shown in FIG. 1.

Figure 1:
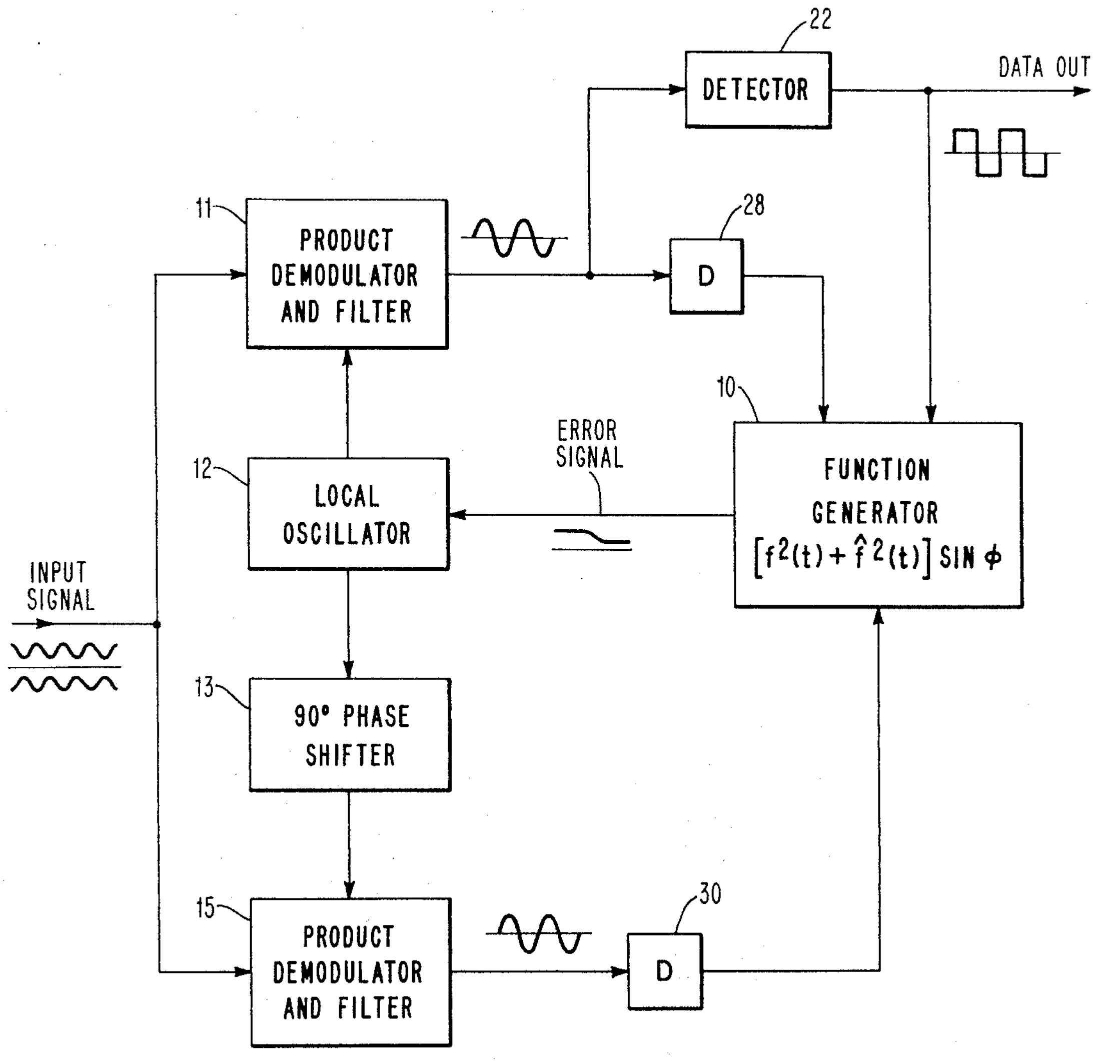
FIG. 1 shows a system embodying the present invention in its broadest form.

As shown in FIG. 1, local oscillator 12 provides means for generating a local oscillation at the carrier frequency of the input signal and is receptive of a control signal for controlling the phase of oscillation. The output of the local oscillator 12 may be represented as $$2\cos(wt+\phi)$$

where $\phi$ is the phase angle difference between the carrier signal and the local oscillator 12.

If the output of local oscillator 12 is shifted by 90°, which may be accomplished by 90° phase shifter 13, the quadrature signal of local oscillator output is obtained. The quadrature signal or output of 90° phase shifter 13 will be of the form $$2\sin(wt+\phi).$$

Upon both the synchronous detection or combination of the input signal with the output of local oscillator 12 and its quadrature signal and the filtering of carrier second harmonic terms by product demodulator 11 and product demodulator 15, we obtain $$f(t)\cos\phi-\hat{f}(t)\sin\phi$$

for the output of product demodulator 11 or first combining means and $$\hat{f}(t)\cos\phi+f(t)\sin\phi$$

for the output of product demodulator 15 or second combining means.

Detection by detector 22 of the output of product demodulator 11 can be utilized to obtain the baseband data waveform $d(t)$. Since $d(t)$ is now obtained it can be inputted into function generator 10 where it may be used to obtain the filtered version of the baseband data waveform $f(t)$ and the Hilbert transform, $\hat{f}(t)$. By multiplying, within function generator 10, the delayed output of product demodulator 11 by $f(t)$ and multiplying the delayed output of product demodulator 15 by $\hat{f}(t)$, we may obtained, after subtraction, $$[f^2(t)+\hat{f}^2(t)]\sin\phi$$

It should be noted that the delay accomplished by first delay means, delay 28 and second delay means, delay 30 of FIG. 1 is such that it corresponds to the delay encountered by the signal in detector 22 and time required for the production of the baseband data waveforms in function generator 10.

In order to produce the error or control signal to correct local oscillator 12, control signal generation means, such as function generator 10, can be utilized. The output is clearly a suitable reference since it is directly proportional to the phase difference between the local oscillator 12 output and the carrier signal. It should be noted that the bracketed term must be nonnegative and the sine term is odd making it a suitable reference which can be applied to local oscillator 12 to drive the phase error to zero.

DETAILED DESCRIPTION

Figure 2:
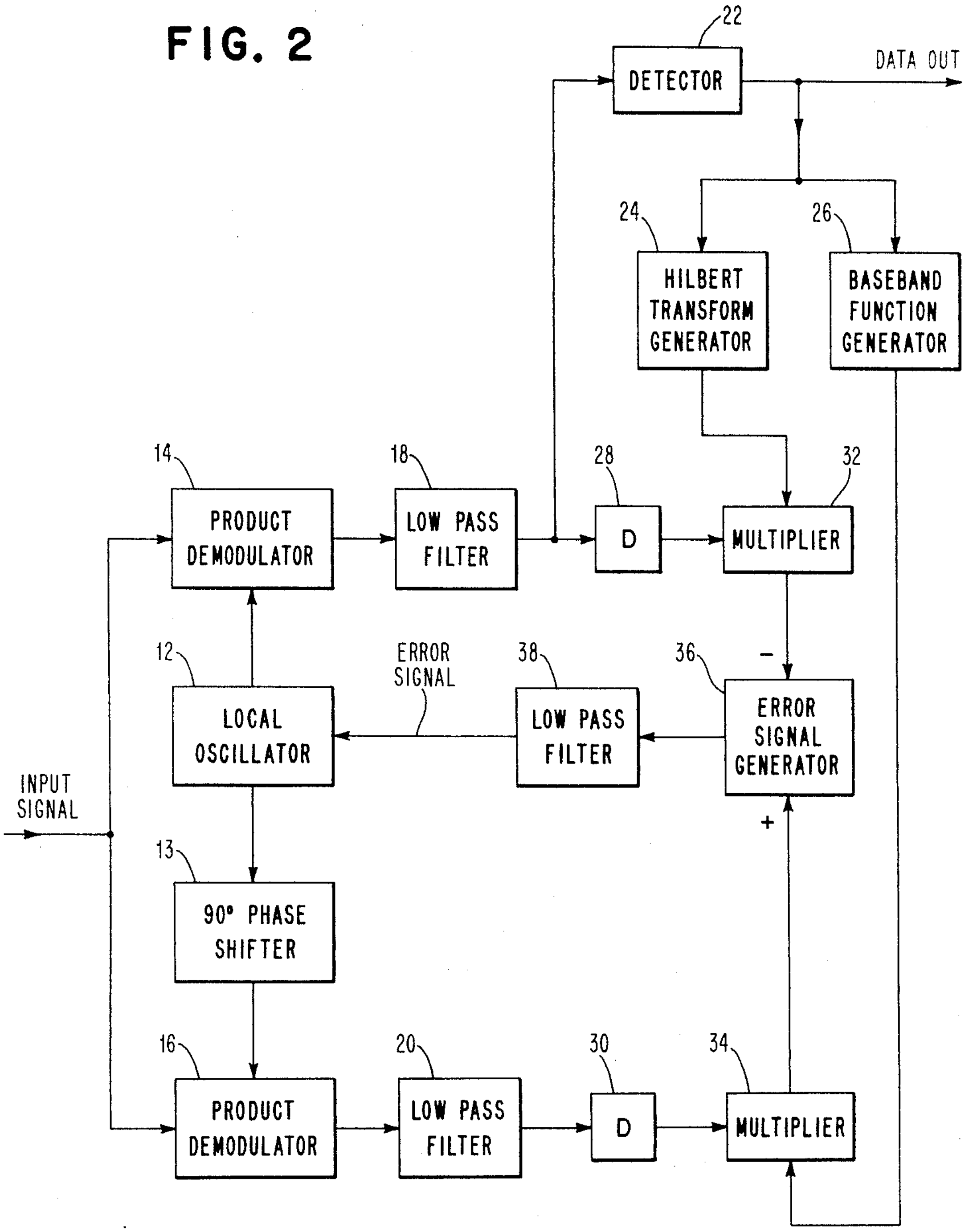
FIG. 2 shows a detailed embodiment of FIG. 1 which depicts how the function of FIG. 1 might be generated.

A more detailed embodiment of the present invention that shows how the function generation of FIG. 1 might be accomplished is depicted in FIG. 2. This embodiment consists of a local oscillator 12, a 90° phase shifter 13, a pair of product demodulators 14, 16, a pair of low pass filters 18, 20, a pair of delays 28, 30, a pair of multipliers 32, 34, an error signal generator 36, a detector 22, a baseband function generator 26, a Hilbert transform generator 24, and a low pass filter 38.

Local oscillator 12 functions to generate a local oscillation at the carrier frequency of the input signal and is receptive of an error or control signal from low pass filter 38 to control the phase of oscillation. An example of the type unit that may be employed is a voltage controlled oscillator (VCO).

90° phase shifter 13 is utilized to shift in phase by 90° the output of local oscillator 12 and apply the shifted signal to product demodulator 16. The resultant signal, after it has been shifted in phase 90°, is in quadrature relation with the local oscillator 12 output.

Product demodulators 14 and 16 are utilized for developing an output which is the mathematical product of the signals applied to the inputs of each device. The first combining means, product demodulator 14, is used to combine the input wave with the output of local oscillator 12 to produce a first demodulated wave. The second combining means, product demodulator 16, is used to combine the input wave with the quadrature signal of local oscillator 12, or the output of 90° phase shifter 13, to product a second demodulated wave.

Since the output of product demodulators 14 and 16 are the products of the signals applied to their inputs they contain undesired harmonic terms. First low pass filter means, low pass filter 18, and second low pass filter means, low pass filter 20, are provided to filter out these undesired harmonic terms and only pass frequencies of the demodulated wave, that is, the outputs of product demodulator 14 and 16, up to the predetermined maximum frequency of the baseband data waveform.

The output of low pass filter 18 is inputted to detector 22 which provides a means for detecting the baseband data waveform. In the case of a binary signal, for example, it could be a threshold detector.

In order to produce the baseband data waveform the output of detector 22 is inputted into baseband function generator 26. The baseband function generator 26 could simply consist of a low pass filter chosen to pass the baseband waveform frequency components and delaying means to correspond to the duration required for phase shifting in the Hilbert transform generator 24.

The output of detector 22 is also inputted into Hilbert transform generator 24 in order to produce the Hilbert transform of the baseband data waveform. Since the Hilbert transform of a function is essentially the function after all its frequency components have been shifted by 90°, the Hilbert transform generator could be a 90° phase shifter used in conjunction with, and subsequent to, a low pass filter chosen to pass the baseband waveform frequency components.

In order to delay the output of low pass filters 18 and 20, for a duration of time corresponding to the period required for the detection of the output of low pass filter 18 by detector 22 and the production of the baseband data waveform in function generator 26 and its Hilbert transform in Hilbert transform generator 24, first delay means, delay 28, and second delay means, delay 30, respectively, are utilized.

First multiplication means, multiplier 32, is utilized to multiply the output of delay 28 with the Hilbert transform of the detected signal, that is, the output of Hilbert transform generator 24. Second multiplication means, likewise, multiplier 34, is utilized to multiply the output of delay 30 with the baseband data waveform or the output of baseband data waveform or the output of baseband function generator 26.

Error signal generator 36 is utilized to produce an error signal. This signal is produced by subtracting the output of multiplier 32 from the output of multiplier 34. A standard summer could be utilized for this function.

Third low pass filter means, low pass filter 38, is provided to eliminate any undesired second harmonic terms introduced by the multiplying operation. Low pass filter 38 will pass only frequencies up to a predetermined maximum frequency. The output or error signal from low pass filter 38 is applied to local oscillator 12 to maintain the output in phase with the received input carrier wave. Thus, the circuit of FIG. 2 maintains the local oscillator 12 in synchronism with the carrier wave to obtain the desired modulating wave without the need of any transmitted tone or vestigial sideband.

OPERATION

The operation of the circuit in FIG. 2 will become clearer by consideration of an example. As stated above the input single sideband amplitude modulator signal is represented by the equation $$s(t)=f(t)\cos wt+\hat{f}(t)\sin wt.$$

Also the output of local oscillator 12 is represented by the equation $$2\cos(wt+\phi)$$

and when shifted by 90° phase shifter 13 it is represented by $$2\sin(wt+\phi).$$

The input signal and the output of local oscillator 12 are inputted into product demodulator 14 and results in the mathematical product of the signals. The output is then filtered to remove the undesired carrier second harmonic terms by low pass filter 18 and the signal is in the form $$f(t)\cos\phi-\hat{f}(t)\sin\phi.$$

In a similar manner, the input signal and the output of 90° phase shifter 13, or the quadrature signal of local oscillator 12, are input into product demodulator 16 and result in the mathematical product of the signals. The output is then filtered, by low pass filter 20, of the undesired carrier second harmonic terms and the signal is in the form $$\hat{f}(t)\cos\phi+f(t)\sin\phi.$$

Detection of the output of low pass filter 18 by detector 22 produces the baseband data waveform $d(t)$. The output of detector 22 is then applied to Hilbert transform generator 24 and the Hilbert transformation of the detected signal is produced. The output of Hilbert transform generator 24 is then applied to multiplier 32 along with the output of low pass filter 18 which has been delayed by delay 28. The output of multiplier 32 is, therefore, of the form $$f(t)\hat{f}(t)\cos\phi-\hat{f}_2(t)\sin\phi.$$

In a similar manner, the output of detector 22 is applied to baseband function generator 26 and the filtered version of the baseband data waveform $f(t)$ is produced. The output of baseband function generator 26 is then applied to multiplier 34 along with the output of low pass filter 20 which has been delayed by delay 30. The output of multiplier 34, therefore, is in the form $$\hat{f}(t)f(t)\cos\phi+f^2(t)\sin\phi.$$

The outputs of multiplier 34 and multiplier 32 to error signal generator 36 generates the error signal. Since error signal generator 36 subtracts the output of multiplier 32 from the output of multiplier 34, the error signal, after filtering by low pass filter 38, is represented by $$[f^2(t)+f^2(t)]\sin\phi.$$

The error or control signal is now used to correct the local oscillator 1. The error signal when applied to local oscillator 12 adjusts the phase of local oscillator 12 to maintain the output in phase with the received input carrier wave. Thus, the circuit of FIG. 2 maintains local oscillator 12 in synchronism with the carrier wave to obtain the desired modulating wave without the need of any transmitted tone or vestigial sideband.

While the invention has been particularly shown and described with reference to the preferred embodiment thereof, it will be understood by those skilled in the art that various changes in form and details may be made therein without departing from the spirit and scope of the invention. For example, it would be obvious to one ordinarily skilled in the art, that this technique could be adapted to a two quadrature channel system. In this type system $\hat{f}(t)$ would be replaced by $g(t)$ which is a filtered data stream independent of $f(t)$. The filter data system, $g(t)$, would be obtained from the data output of the independent data stream output and inputted into a multiplier in a manner similar to that employed with the Hilbert transform, $\hat{f}(t)$, as described above.

What is claimed is:

1. A synchronized receiver receptive of a single sideband amplitude modulated input wave wherein the local oscillator is synchronized with the input wave comprising:

local oscillator means for generating a local oscillation at the carrier frequency of said input wave and receptive of a control signal for controlling the phase of oscillation;

means for generating a second wave in phase quadrature relation with said local oscillator wave connected to the output of said local oscillator means;

first combining means for combining said input wave with said local oscillator output wave to produce a first demodulated wave;

first delay means for delaying the output of said first combining means;

means for detecting the output of said combining means;

second combining means for combining said input wave with the output of said phase quadrature generating means to produce a second demodulated wave;

second delay means for delaying the output of said second demodulated wave;

control signal generation means to produce the function $$[f^2(t)+\hat{f}^2(t)]\sin\phi$$

from the output of said detection means, the output of said first delay means and the output of said second delay means wherein $f(t)$ is the filtered baseband data waveform; $\hat{f}(t)$ is the Hilbert transform of $f(t)$ and $\phi$ is the phase angle difference between said input signal and said local oscillator output.

2. A synchronized receiver receptive of a single sideband amplitude modulated input wave wherein the local oscillator is synchronized with the input wave comprising:

local oscillator means to generate a local oscillation at the carrier frequency of said input signal and receptive of a control signal for controlling the phase of oscillation;

means connected to output of said local oscillator means for generating a second wave in phase quadrature relation with said local oscillator wave connected to the output of said local oscillator means;

first combining means for combining said input wave with said local oscillator output wave to produce a first demodulated wave;

first low pass filter means connected to the output of said first combining means for passing frequencies of said first demodulated wave up to the predetermined maximum frequency of the baseband data waveform;

first delay means connected to the output of said first low pass filter means for delaying output of said first low pass filter means;

means for detecting the output of said first low pass filter;

baseband data waveform generating means for producing the filtered baseband data waveform from the output of said detecting means;

Hilbert transform generating means for producing the Hilbert transform of baseband data waveform from the output of said detecting means;

first multiplication means for multiplying the output of said Hilbert transform generating means with the output of said first delay means;

second combining means for combining said input wave with the output of said phase quadrature generating means to produce a second demodulated wave;

second low pass filter means connected to the output of said second combining means for passing frequencies of said second demodulated wave up to the predetermined maximum frequency of the baseband data waveform;

second delay means for delaying the output of said second low pass filter means;

second multiplication means for multiplying the output of said baseband data waveform generating means by the output of said second delay means;

error signal generation means for generating an error signal equalling the difference between the output of said second multiplication means and the output of said first multiplication means;

third low pass filter means connected to said error signal generation means to pass only output frequencies of said error signal generation means up to a predetermined maximum frequency and to input said control signal to said local oscillator generating means to vary its phase.

3. A synchronized receiver as set forth in claim 2 wherein said local oscillator is a voltage controlled oscillator.

4. A synchronized receiver as set forth in claim 3 wherein said first and second combining means are product demodulators.

5. A synchronized receiver as set forth in claim 4 wherein said error signal generation means is a summer.

6. A synchronized receiver as set forth in claim 5 wherein said Hilbert transformation generating means is a low pass filter and a 90° phase shifter.

7. A synchronized receiver as set forth in claim 6 wherein said baseband function generator is a low pass filter.

8. A synchronized receiver receptive of two quadrature channel, single sideband amplitude modulated input wave wherein the local oscillation is synchronized with the input wave comprising:

local oscillator means to generate a local oscillation at the carrier frequency of said input signal and receptive of a control signal for controlling the phase of oscillation;

means connected to output of said local oscillator means for generating a second wave in phase quadrature relation with said local oscillator wave connected to the output of said local oscillator means;

first combining means for combining said input wave with said local oscillator output wave to produce a first demodulated wave;

first low pass filter means connected to the output of said first combining means for passing frequencies of said first demodulated wave up to the predetermined maximum frequency of the baseband data waveform;

first delay means connected to the output of said first low pass filter means for delaying output of said first low pass filter means;

first means for detecting the output of said first low pass filter;

first baseband data waveform generating means for producing the filtered baseband data waveform from the output of said first detecting means;

first multiplication means for multiplying the output of said first baseband data waveform generating means with the output of said first delay means;

second combining means for combining said input wave with the output of said phase quadrature generating means to produce a second demodulated wave;

second low pass filter means connected to the output of said second combining means for passing frequencies of said second demodulated wave up to the predetermined maximum frequency of the baseband data waveform;

second delay means connected to the output of said second low pass filter means for delaying the output of said second low pass filter means;

second means for detecting the output of said second low pass filter;

second baseband data waveform generating means for producing the filtered baseband data waveform from the output of said second detecting means;

second multiplication means for multiplying the output of said baseband data waveform generating means by the output of said second delay means;

error signal generation means for generating between the output of said second multiplication means and the output of said first multiplication means;

third low pass filter means connected to said error signal generation means to pass only output frequencies of said error signal generation means up to a predetermined maximum frequency and to input said control signal to said local oscillator generating means to vary its phase.

* * * * *